June 4, 1957  C. H. TOSSWILL ET AL  2,794,939
VOLTAGE STABILIZER CIRCUIT ARRANGEMENT
Filed Feb. 26, 1954
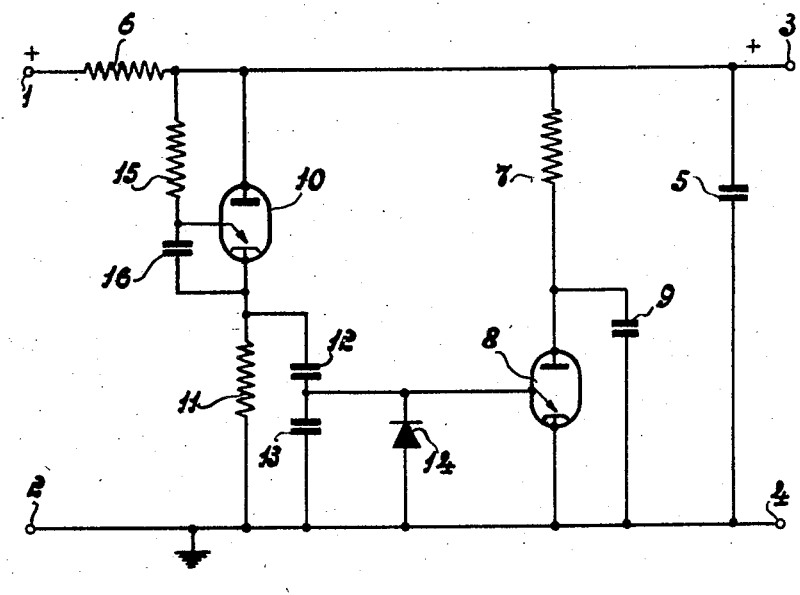
INVENTORS
CHRISTOPHER HALY TOSSWILL
GERALD OFFLEY CROWTHER
LEON HENRY LIGHT
BY
AGENT 2,794,939
Patented June 4, 1957

2,794,939

VOLTAGE STABILIZER CIRCUIT ARRANGEMENT

Christopher Haly Tosswill, Carshalton, and Gerald Offley Crowther, New Malden, England, and Leon Henry Light, Glasgow, Scotland, assignors, by mesne assignments, to North American Philips Company, Inc., New York, N. Y., a corporation of Delaware Application February 26, 1954, Serial No. 412,778

Claims priority, application Great Britain May 8, 1953

7 Claims. (Cl. 315—230)

The present invention relates to a voltage stabilizer circuit arrangement. More particularly, the invention relates to circuit arrangements which produce a stabilized substantially D. C. voltage output with varying load and input voltages. Such circuit arrangements may be used for example for supplying cathode ray tubes, Geiger-Müller tubes and the like.

An object of the invention is to provide an improved voltage stabilizer circuit arrangement. Stabilizer circuit arrangements of a like nature are also described and claimed in co-pending applications Serial No. 412,010, filed February 23, 1954, and Serial No. 412,777, filed February 26, 1954.

According to the present invention, a voltage stabilizer circuit arrangement comprises a reservoir capacitor connected across the output terminals of the circuit arrangement which is to be charged through a series resistor, a cold cathode trigger-controlled gas discharge tube, the series combination of a second resistor and said tube being connected in parallel with said reservoir capacitor, a charging capacitor being connected substantially between the anode and cathode of said tube and sampling means for sampling at intervals the voltage across the output terminals, which sampling means supplies to the trigger electrode of said tube a signal having an amplitude dependent upon the voltage at the output terminals.

The sampling means may comprise a second cold cathode trigger controlled gas discharge tube. Said second tube may be adapted to conduct at intervals and its cathode circuit may comprise a voltage divider.

In order that the invention may be readily carried into effect, reference will now be made, by way of example, to the accompanying drawing wherein the single figure is a schematic diagram of a preferred embodiment of the voltage stabilizer circuit arrangement of the present invention. The circuit arrangement is provided with input terminals 1, 2 which are for connection to a D. C. source (not shown) which produces a voltage in excess of the required stabilized voltage. Output terminals 3, 4 are for connection to a load and have connected between them a reservoir capacitor 5. Connected between input terminal 1 and output terminal 3 is a resistor 6 through which the reservoir capacitor 5 is charged. In parallel with capacitor 5 there is connected the series connection of resistor 7 and cold cathode trigger-controlled gas discharge tube 8, which tube 8 has connected in parallel with it a capacitor 9. Also in parallel with capacitor 5 is the series connection of a second cold cathode grid-controlled gas discharge tube 10 and a resistor 11. In parallel with resistor 11 is connected a potential divider comprising capacitors 12 and 13 in series. The junction point of the capacitors 12 and 13 is connected to the trigger electrode of the tube 8. Across capacitor 13 is connected a rectifier 14 which prevents the trigger electrode of the tube 8 from becoming negative with respect to its cathode.

The trigger electrode of tube 10 is connected, on the one hand, to the anode of the tube 10 by means of a resistor 15 and, on the other hand, to the cathode of the tube 10 by means of a capacitor 16. The time constant of resistor 15 and capacitor 16 is long compared with that of resistor 11 and capacitors 12 and 13.

The circuit arrangement operates as follows.

Starting at the point where tube 10 is non-conducting and capacitor 16 is discharged it will be seen that there is no potential difference across resistor 11 and therefore the cathode of tube 10 is at ground potential. The capacitor 16 charges through resistors 15 and 11 until the trigger ignition potential occurs between the trigger and cathode of tube 10. Tube 10 strikes and the cathode voltage rises until the extinction voltage occurs between the anode and cathode, and the tube is extinguished. The capacitor 16 is discharged or partially discharged by the trigger electrode current, and the cathode voltage falls. Thus it will be seen that a pulse has occurred resistor 11 having an amplitude which is equal to the voltage across the output terminals 3 and 4 less the extinction voltage of the tube 10. Since the tube 10 extinction voltage is fixed and stable, the pulse amplitude is a direct indication of the voltage across the output terminals 3 and 4. Thus any change in voltage across the output terminals 3 and 4 will produce an equal change in the amplitude of the pulse. Tube 10 operates in this way at a frequency which is determined to a considerable extent by the time constant of resistor 15 and capacitor 16. This circuit acts as a sampling circuit which samples the output voltage across the output terminals 3 and 4 at regular intervals. The pulses produced across the resistor 11 are applied to the potential divider comprising capacitors 12 and 13, and a proportion of each pulse, which proportion depends upon the ratio of the two capacitors 12 and 13, is applied to the trigger electrode of the second tube 8. When the voltage across the output terminals 3 and 4 rises due to the reservoir capacitor 5 being charged through resistor 16, a predetermined value is reached at which a corresponding pulse amplitude is applied to the trigger electrode of the tube 8 which is just sufficient to strike the said tube. Thereupon capacitor 9 is discharged by the tube 8 until the said tube extinguishes, and then capacitor 9 is recharged via resistor 7. The charging of capacitor 9 reduces the voltage across the output terminals 3 and 4 by taking a fixed charge from the reservoir capacitor 5. The voltage across the output terminals 3 and 4 rises again as reservoir capacitor 5 is recharged via resistor 6 and the whole operation repeats itself. Although the voltage across the output terminals 3 and 4 may have a small ripple in it, the amplitude is constant so that a stabilized substantially D. C. voltage output is obtained. If the load increases or if the input voltage decreases, the frequency of operation of the tube 8 is decreased, whereas if the load decreases or if the input voltage increases the frequency of operation of the tube 8 is increased.

While the invention has been described by means of a specific example and in a specific embodiment, we do not wish to be limited thereto, for obvious modifications will occur to those skilled in the art without departing from the spirit and scope of the invention.

What is claimed is:

1. A voltage stabilizer circuit arrangement comprising a pair of output terminals, a reservoir capacitor connected across said output terminals, a first resistor, means connected in series with said resistor for charging said capacitor in accordance with the value of an unstabilized input voltage, a first cold cathode trigger-controlled gas discharge tube having an anode, a cathode, and a trigger electrode, a second resistor connected in series with said tube, the series combination of said tube and said second resistor being connected across said capacitor, a second capacitor connected substantially between the anode and the cathode of said tube, and sampling means for sampling at intervals of time the voltage across said reservoir capacitor, said sampling means being coupled to a terminal of said reservoir capacitor to apply a signal having an amplitude dependent upon the voltage across said reservoir capacitor to the trigger electrode of said tube thereby to produce periodic conduction in said tube at a rate determined by the value of said output voltage.

2. A voltage stabilizer circuit arrangement as set forth in claim 1, wherein said sampling means comprises a second cold cathode trigger-controlled gas discharge tube.

3. A voltage stabilizer circuit arrangement as claimed in claim 2, wherein said sampling means further includes said second gas discharge tube having a cathode, means coupled to said second tube for rendering said tube conductive at given intervals of time, and a voltage divider coupled to the cathode of said second gas discharge tube.

4. A voltage stabilizer circuit arrangement as claimed in claim 3, wherein said voltage divider includes capacitors.

5. A voltage stabilizer circuit arrangement comprising a reservoir capacitor, a first resistor, means connected in series with said resistor for charging said capacitor, a first cold cathode trigger-controlled gas discharge tube having an anode, a cathode, and a trigger electrode, a second resistor connected in series with said tube, the series combination of said tube and said second resistor being connected across said capacitor, a second capacitor connected substantially between the anode and the cathode of said tube, and sampling means for sampling at intervals of time the voltage across said reservoir capacitor, said sampling means being coupled to a terminal of said reservoir capacitor to apply a signal having an amplitude dependent upon the voltage across said reservoir capacitor to the trigger electrode of said tube and comprising a second cold cathode trigger-controlled gas discharge tube having a cathode, means coupled to said second tube for rendering said tube conductive at given intervals of time, and a voltage divider coupled to the cathode of said second gas discharge tube.

6. A voltage stabilizer circuit arrangement comprising a reservoir capacitor, a first resistor, means connected in series with said resistor for charging said capacitor, a first cold cathode trigger-controlled gas discharge tube having an anode, a cathode, and a trigger electrode, a second resistor connected in series with said tube, the series combination of said tube and said second resistor being connected across said capacitor, a second capacitor connected substantially between the anode and the cathode of said tube, and sampling means for sampling at intervals of time the voltage across said reservoir capacitor, said sampling means being coupled to a terminal of said reservoir capacitor to apply a signal having an amplitude dependent upon the voltage across said reservoir capacitor to the trigger electrode of said tube and comprising a second cold cathode trigger-controlled gas discharge tube having a cathode, means coupled to said second tube for rendering said tube conductive at given intervals of time, and a voltage divider coupled to the cathode of said second gas discharge tube, said voltage divider including capacitors.

7. A voltage stabilizer circuit arrangement comprising a reservoir capacitor, a first resistor, means connected in series with said resistor for charging said capacitor, a first cold cathode trigger-controlled gas discharge tube having an anode, a trigger electrode and a cathode connected to a point of ground potential, a second resistor connected in series with said tube, the series combination of said tube and said second resistor being connected across said capacitor, a second capacitor connected substantially between the anode and cathode of said tube, and sampling means for sampling at given intervals of time the voltage across said reservoir capacitor, said sampling means being coupled to the positively charged terminal of said reservoir capacitor to apply a signal having an amplitude dependent upon the voltage across said reservoir capacitor to the trigger electrode of said first tube, said sampling means comprising a second cold cathode trigger-controlled gas discharge tube having an anode, a cathode, and a trigger electrode, a third resistor connected between the cathode of said second tube and said point of ground potential, the series combination of said second tube and third resistor being connected across said reservoir capacitor, a fourth resistor connected between the anode and trigger electrode of said second tube, a third capacitor connected between the trigger electrode and cathode of said second tube, a fourth capacitor connected between the cathode of said second tube and the trigger electrode of said second tube, a fifth capacitor connected between the trigger electrode of said second tube and said point of ground potential, and a rectifier connected across said fifth capacitor to prevent the trigger electrode of said first tube from being negative with respect to the cathode of said first tube.

References Cited in the file of this patent

UNITED STATES PATENTS

| | | |
|---|---|---|
| 2,097,882 | Hudtwalker | Nov. 2, 1933 |
| 2,186,013 | Edgerton | Jan. 9, 1940 |
| 2,331,317 | Germeshausen | Oct. 13, 1943 |
| 2,459,624 | Collin | Jan. 18, 1949 |

FOREIGN PATENTS

| | | |
|---|---|---|
| 686,092 | Great Britain | Jan. 21, 1953 |